United States Patent
Maruskin

(10) Patent No.: US 10,547,658 B2
(45) Date of Patent: Jan. 28, 2020

(54) SYSTEM AND METHOD FOR MANAGING CONTENT PRESENTATION ON CLIENT DEVICES

(71) Applicant: Cognant LLC, Mountain View, CA (US)

(72) Inventor: Jared Maruskin, San Jose, CA (US)

(73) Assignee: Cognant LLC, Mountain View, CA (US)

( * ) Notice: Subject to any disclaimer, the term of this patent is extended or adjusted under 35 U.S.C. 154(b) by 56 days.

(21) Appl. No.: 15/924,850

(22) Filed: Mar. 19, 2018

(65) Prior Publication Data

US 2018/0278665 A1   Sep. 27, 2018

Related U.S. Application Data

(60) Provisional application No. 62/475,441, filed on Mar. 23, 2017.

(51) Int. Cl.
*G06F 15/16* (2006.01)
*H04L 29/06* (2006.01)
*G06K 9/00* (2006.01)

(52) U.S. Cl.
CPC .......... *H04L 65/60* (2013.01); *G06K 9/00228* (2013.01); *H04L 67/42* (2013.01)

(58) Field of Classification Search
CPC .. H04N 21/44218; H04H 60/33; H04H 60/46; H04H 60/65
USPC ....................................................... 709/231
See application file for complete search history.

(56) References Cited

U.S. PATENT DOCUMENTS

| | | | |
|---|---|---|---|
| 9,753,925 B2* | 9/2017 | Cremer | G06F 17/30864 |
| 10,009,644 B2* | 6/2018 | Aimone | H04N 21/42201 |
| 2002/0143414 A1* | 10/2002 | Wilcock | G11B 19/025 |
| | | | 700/94 |
| 2005/0057491 A1* | 3/2005 | Zacks | G06F 21/84 |
| | | | 345/156 |
| 2005/0195330 A1* | 9/2005 | Zacks | H04N 7/147 |
| | | | 348/564 |
| 2013/0036011 A1 | 2/2013 | Roberts et al. | |
| 2013/0174045 A1 | 7/2013 | Sarukkai et al. | |
| 2014/0223462 A1* | 8/2014 | Aimone | H04N 21/42201 |
| | | | 725/10 |
| 2014/0274353 A1* | 9/2014 | Benson | G06F 3/01 |
| | | | 463/29 |
| 2014/0337742 A1* | 11/2014 | Jarvinen | H04N 1/2112 |
| | | | 715/732 |

(Continued)

OTHER PUBLICATIONS

Int'l Search Report and Written Opinion of the ISA/EP in PCT/US2018/023078; dated Jun. 7, 2018. 13 pgs.

*Primary Examiner* — Phuoc H Nguyen
(74) *Attorney, Agent, or Firm* — Goodwin Procter LLP

(57) ABSTRACT

Implementations of the present disclosure are directed to a method, a system, and an article for managing the presentation of content on client devices. An example computer-implemented method can include: receiving, from a client device, an indication of a presentation state (including a sound state) on the client device; providing the indication of the presentation state to a plurality of content providers; receiving from each content provider a proposal to present an item of content on the client device; selecting one of the proposals; and sending, to the client device, an identification of the item of content associated with the selected proposal.

18 Claims, 3 Drawing Sheets

(56) References Cited

U.S. PATENT DOCUMENTS

| | | | | |
|---|---|---|---|---|
| 2014/0340992 | A1* | 11/2014 | Wouhaybi | H04N 21/42203 367/93 |
| 2015/0258301 | A1* | 9/2015 | Trivedi | A61M 21/02 600/28 |
| 2018/0014066 | A1* | 1/2018 | Berman | H04N 21/4312 |
| 2018/0025232 | A1* | 1/2018 | Eronen | H04N 7/18 382/103 |

* cited by examiner

SYSTEM AND METHOD FOR MANAGING CONTENT PRESENTATION ON CLIENT DEVICES

CROSS-REFERENCE TO RELATED APPLICATIONS

This application claims the benefit of U.S. Provisional Patent Application No. 62/475,441, filed Mar. 23, 2017, the entire contents of which are incorporated by reference herein.

BACKGROUND

The present disclosure relates generally to digital content and, in some examples, to systems and methods for managing the presentation of digital content on client devices.

Client devices are generally capable of presenting a wide variety of content, including images, video, audio, and combinations thereof. Such content can be stored locally on client devices and/or can be sent to the client devices from server computers over a network (e.g., the Internet). In many instances, however, content provided to a client device can be inconsistent with current presentation capabilities of the client device. For example, a client device can receive an image but can be unable to present the image to a user because a display on the client device is turned off and/or the user is not looking at the display. Likewise, a client device can receive audio and/or a video with sound but can be unable to produce sounds for the user because sound is disabled on the client device and/or the user is not listening to the sounds.

Providing content to users who cannot experience the content is, in general, a waste of system resources. Computer processors and networks are unnecessarily burdened by the selection, transmission, and/or presentation of such content, which, in the case of video, can represent a large (e.g., 90% or more) portion of total network traffic. The situation can be frustrating for users who are unable to experience certain content and/or are paying for content they cannot use.

SUMMARY

In general, the subject matter described herein relates to systems and methods for providing content to client devices that is compatible with the presentation capabilities of the client devices. In certain examples, a presentation state (e.g., a sound state and/or a display state) on a client device is determined and shared with a content manager. The content manager provides the presentation state to one or more content providers that can search for and propose one or more items of compatible content. The content manager can then select one of the proposed items of content and send an identification of the content to the client device. The selected content can be obtained from one or more content servers and presented on the client device.

Advantageously, the systems and methods described herein can improve the performance of computer processors and networks that identify and deliver digital content. In particular, the systems and methods can reduce or eliminate loads on computer system components caused by the presentation of content that users are unable to experience or that is incompatible with client devices. This allows computer processors (e.g., on server systems and/or client devices) to operate more efficiently and can significantly reduce network traffic, particular in the context of video content.

In one aspect, the subject matter described in this specification relates to a computer-implemented method. The method includes: receiving, from a client device, an indication of a presentation state (e.g., including a sound state) on the client device; providing the indication of the presentation state to a plurality of content providers; receiving from each content provider a proposal to present an item of content on the client device; selecting one of the proposals; and sending, to the client device, an identification of the item of content associated with the selected proposal.

In certain examples, the presentation state can provide an indication of an ability of the client device to present content. The sound state can provide an indication of an ability of the client device to produce sound for a user of the client device. The sound state can be based at least in part on an indication that a user is listening to sound produced by the client device. The presentation state can include a display state, and the display state can include an indication of a current ability of the client device to display images for a user of the client device. The display state can be based at least in part on a detection of a human face in front of a display on the client device.

In various instances, the presentation state can be based at least in part on: a sound enablement setting on the client device, a status of a display on the client device, an orientation of the display on the client device, a movement history for the client device, a connection between the client device and an external display, a connection between the client device and an external speaker, and/or any combination thereof. Providing the indication of the presentation state can include sending the indication of the presentation state over a network from at least one server computer to the plurality of content providers. The item of content associated with the selected proposal is or can be compatible with the presentation state. Sending, to the client device, the identification of the item of content can include: sending a link to the selected item of content, streaming the selected item of content, sending a file for the selected item of content, and/or any combination thereof.

In another aspect, the subject matter described in this specification relates to a system. The system includes one or more computer processors programmed to perform operations including: receiving, from a client device, an indication of a presentation state (e.g., including a sound state) on the client device; providing the indication of the presentation state to a plurality of content providers; receiving from each content provider a proposal to present an item of content on the client device; selecting one of the proposals; and sending, to the client device, an identification of the item of content associated with the selected proposal.

In certain implementations, the presentation state can provide an indication of an ability of the client device to present content. The sound state can provide an indication of an ability of the client device to produce sound for a user of the client device. The sound state can be based at least in part on an indication that a user is listening to sound produced by the client device. The presentation state can include a display state, and the display state can include an indication of a current ability of the client device to display images for a user of the client device. The display state can be based at least in part on a detection of a human face in front of a display on the client device.

In various examples, the presentation state can be based at least in part on: a sound enablement setting on the client device, a status of a display on the client device, an orientation of the display on the client device, a movement history for the client device, a connection between the client device and an external display, a connection between the client device and an external speaker, and/or any combination thereof. Providing the indication of the presentation state can include sending the indication of the presentation state over a network from at least one server computer to the plurality of content providers. The item of content associated with the selected proposal is or can be compatible with the presentation state. Sending, to the client device, the identification of the item of content can include: sending a link to the selected item of content, streaming the selected item of content, sending a file for the selected item of content, and/or any combination thereof.

In another aspect, the subject matter described in this specification relates to an article. The article includes a non-transitory computer-readable medium having instructions stored thereon that, when executed by one or more computer processors, cause the computer processors to perform operations including: receiving, from a client device, an indication of a presentation state (e.g., including a sound state) on the client device; providing the indication of the presentation state to a plurality of content providers; receiving from each content provider a proposal to present an item of content on the client device; selecting one of the proposals; and sending, to the client device, an identification of the item of content associated with the selected proposal.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims

DETAILED DESCRIPTION

In various examples, an ability of a client device to present content (e.g., videos, images, text, audio, and any combination thereof) to a user can be referred to herein as a "presentation state" of the client device. The presentation state can include a "sound state" (e.g., an ability of the client device to present sound to the user and/or an ability of the user to hear the sound) and/or a "display state" (e.g., an ability of the client device to display images and/or graphical elements to the user and/or an ability of the user to see such images and/or graphical elements). The presentation state can be defined using one or more content presentation settings, as described herein, and/or can be determined using an SDK, for example, via a suitable application programming interface (API) call to an operating system for the client device. The SDK can be implemented into and/or used by a software application running on the client device.

Figure 1:
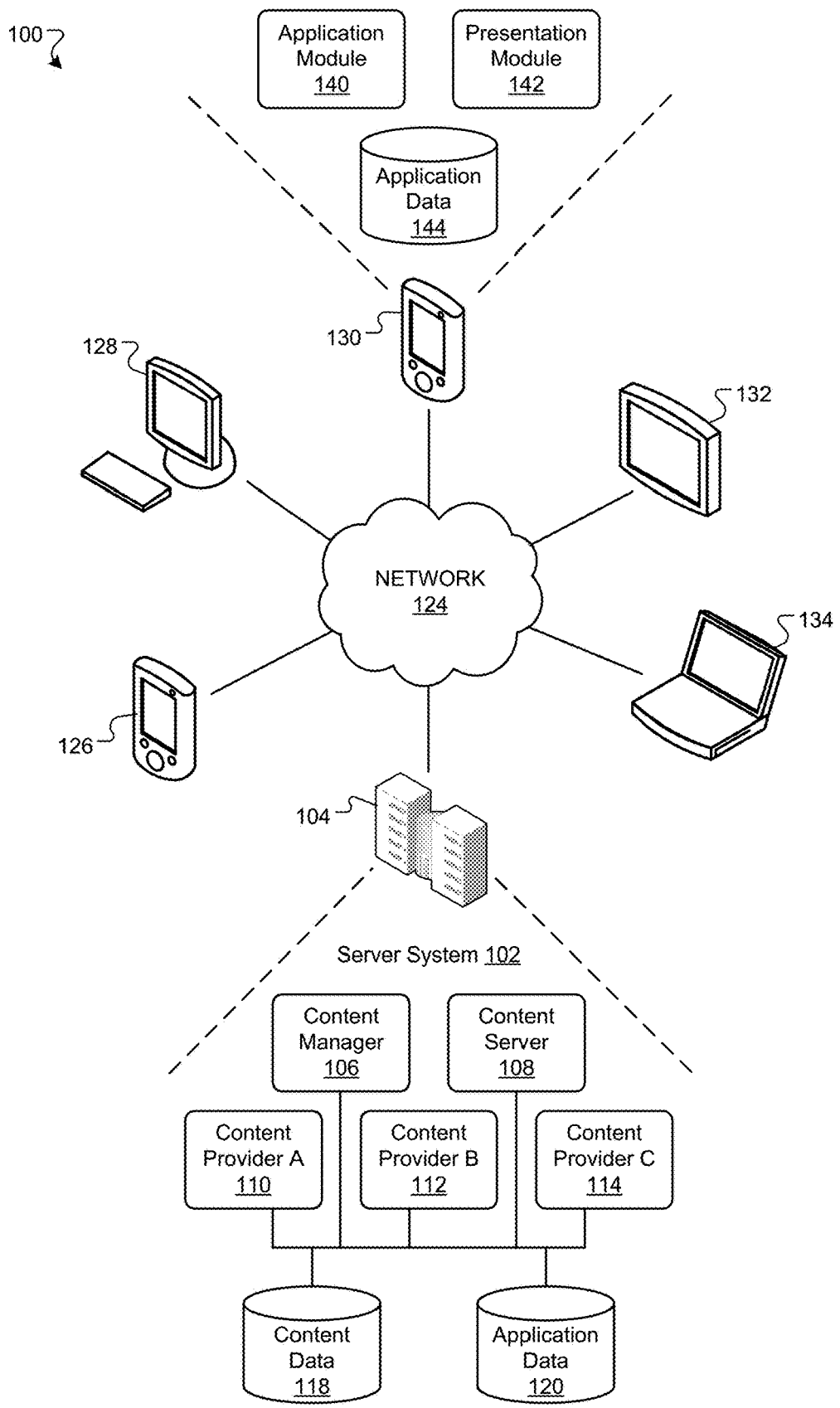
FIG. 1 is a schematic diagram of an example system for managing the presentation of digital content on client devices.

FIG. 1 illustrates an example system 100 for providing digital content to client devices. A server system 102 provides functionality for identifying content according to the client device presentation capabilities. The server system 102 includes software components and databases that can be deployed at one or more data centers 104 in one or more geographic locations, for example. The server system 102 software components can include a content manager 106, a content server 108, and one or more content providers (e.g., content provider A 110, content provider B 112, content provider C 114, and/or any other number of content providers). The server system 102 can include subcomponents that can execute on the same or on different individual data processing apparatus. It is understood, for example, that each software component can execute on a different server computer, or that more than one software component can execute on the same server computer, in any combination. The server system 102 databases can include a content data 118 database and an application data 120 database. The databases can reside in one or more physical storage systems and can exchange data and information with any of the software components. In certain instances, the server system 102 includes or utilizes a content delivery network (CDN). The software components and data will be further described below.

An application, such as, for example, a web-based or other software application can be provided as an end-user application to allow users to interact with the server system 102. The software application or components thereof can be accessed through a network 124 (e.g., the Internet) by users of client devices, such as a smart phone 126, a personal computer 128, a smart phone 130, a tablet computer 132, and a laptop computer 134. Other client devices are possible.

Each client device in the system 100 can utilize or include software components and databases for providing the software application and/or presenting content. The software components on the client devices can include an application module 140 and a presentation module 142. The application module 140 can implement the software application on each client device. The presentation module 142 can be used to determine content presentation settings (e.g., sound and/or display settings) on each client device and to communicate the content presentation settings to the server system 102. The databases on the client devices can include an application data 144 database which can store content or data (e.g., for the software application) and exchange the content or data with the application module 140 and/or the presentation module 142. The data stored on the application data 144 database can include, for example, user data, image data, video data, and any other data or content used or generated by the application module 140 and/or the presentation module 142. While the application module 140, the presentation module 142, and the application data 144 database are depicted as being associated with the smart phone 130, it is understood that other client devices (e.g., the smart phone 126, the personal computer 128, the tablet computer 132, and/or the laptop computer 134) can include the application module 140, the presentation module 142, the application data 144 database, and any portions thereof.

In some examples, the server system 102 can include software components that support the software application by, for example, performing calculations, implementing software updates, exchanging information, content, or data with the application module 140 and/or the presentation module 142, and/or monitoring an overall status of the software application. The application data 120 database can store and provide data for the software application. The data can include, for example, user data, image data, video data, animation data, and/or any other content or data that can be used by the server system 102 and/or client devices (e.g., to run the software application).

The software application implemented on the client devices 126, 128, 130, 132, and 134 can relate to and/or provide a wide variety of functions and information, including, for example, entertainment (e.g., a game, music, images, videos, etc.), business (e.g., word processing, accounting, spreadsheets, etc.), news, weather, finance, sports, web browsing, etc. In certain instances, the software application provides a multi-player online game.

Still referring to FIG. 1, the content manager 106 can include software components that can manage the presentation of content on the client devices 126, 128, 130, 132, and 134. In certain instances, for example, the content manager 106 can receive a request for content from a client device (e.g., the smart phone 130) and identify appropriate content for the client device with assistance from one or more content providers (e.g., content provider A 110, content provider B 112, and content provider C 114). For example, each content provider can offer or suggest an item of content for the client device according to the presentation state (e.g., one or more content presentation settings) for the client device. The content manager 106 can select one of the suggested items of content and the content server 108 can provide the selected content to the client device. Alternatively or additionally, the selected content can be retrieved from the content data 118 database by the content server 108 and/or by the client device.

In certain implementations, the content manager 106 can be, include, or implement a service that provides content to the client devices 126, 128, 130, 132, and 134. The content manager 106, for example, can provide a search engine that allows users to search for specific types of content (e.g., videos, images, music, etc.). The content manager 106 can receive a search request from a client device (e.g., the smart phone 130), along with current presentation settings for the client device, and can use the one or more content providers (e.g., content provider A 110, content provider B 112, and content provider C 114) to search for content that matches criteria from the search request and the content presentation settings. Alternatively or additionally, the content manager 106 can include or provide a service that allows the content providers to compete for an opportunity to present content on the client device. For example, when the client device makes a request for content, the content providers can each suggest an item of content. The content manager 106 can then select one of the items of content for presentation on the client device. In certain instances, for example, the content manager 106 can include or provide an auction for online advertising (e.g., a real-time bidding auction).

In general, the one or more content providers (e.g., content provider A 110, content provider B 112, and content provider C 114) can be, include, or utilize software components that identify content for possible presentation on client devices, in response to requests from the content manager 106. The content providers can be or include, for example, software components and/or databases for content repositories, content service providers, content developers, promoters, and/or advertisers. In some examples, the content providers can be or include software components and/or databases for an online advertising auction.

In general, the systems and methods described herein can be used to search for and provide content to a client device that is compatible with the presentation capabilities of the client device. For example, when the client device requests certain content (e.g., related to entertainment or current events) and the content presentation settings indicate that sound is enabled on the client device, the one or more content providers can search for relevant content that includes sound (e.g., audio files, videos with sound, etc.). Alternatively, if the content presentation settings indicate that sound is disabled on the client device, the one or more content providers can search for relevant content that does not include sound (e.g., images, videos with subtitles, etc.). Likewise, if the content presentation settings indicate that a display on the client device is not activated (or that a user of the client device is not looking at the display), the one or more content providers can search for relevant content that does not include images (e.g., audio files or streaming audio). This way, the user of the client device is able to experience any content that is provided to the client device by the content manager 106. In general, content that is compatible with the presentation state of the client device can be presented fully on the client device and/or can include no features or components (e.g., audio or video) that cannot be presented on the client device.

Various methods and factors can be used to determine the content presentation settings on a client device (e.g., the smart phone 130). In some instances, for example, the software application or other software component can access device settings for sound and/or display. Such device settings can be accessed, for example, using a software development kit for the client device and/or an operating system on the client device. The device settings can be used to determine, for example, sound enablement (e.g., on or off), a sound volume (e.g., low or high), a display setting (e.g., on or off), whether the device is connected to an external speaker (e.g., headphones and/or using a wireless connection, such as BLUETOOTH), and/or whether the device is connected to an external display (e.g., a television or a computer monitor). For example, a low volume or no sound enablement on the client device can indicate that the user is unable to hear sounds from the client device. An active connection to an external speaker, however, can indicate that the user is able to hear such sounds. Additionally or alternatively, one or more sensors in the client device can be used to determine an orientation of the client device and, in particular, to determine if the display is facing downward. This can indicate that the display is facing a table or chair, for example, and that the user probably cannot see the display. In some instances, a camera on the client device can be used to detect a human face in front of the display, for example, through suitable face recognition or face detection techniques. When a face is detected, it is more likely that the user is able to view the display. Additionally or alternatively, sensors in the client device can indicate if a user is or has been interacting with the client device. When the device has not been moved for a threshold amount of time (e.g., 30 minutes, 1 hour, 2 hours, 4 hours, or other threshold amount of time), for example, the user is less likely to be looking at the display or listening to sound from the client device. Further, when an active connection to an external display is detected, the user is likely able to see image or video content provided on the client device.

In various instances, the content presentation settings can be based on multiple factors and can include one or more probability values related to the display and/or sound. The factors that can be considered for sound on the client device include, for example, a sound enablement setting (e.g., on or off), a volume setting (e.g., high or low), and/or a connection to an external audio device (e.g., headphones and/or using a wireless connection). When one or more of the sound factors indicate a low, medium, or high probability that the user is able to experience sound on the client device, a sound probability value in the content presentation settings can be low (e.g., 0% or about 10%), medium (e.g., about 50%), or high (e.g., about 90% or 100%), respectively. Likewise, the factors that can be considered for the display on the client device include, for example, a display setting (e.g., on or off), a facial recognition factor (e.g., an indication that a face has been detected in front of the display), and/or a connection to an external display device (e.g., a television or separate computer monitor). When one or more of the display factors indicate a low, medium, or high probability that the user is able to experience images or other displayed content on the client device, a display probability value in the content presentation settings can be low (e.g., 0% or about 10%), medium (e.g., about 50%), or high (e.g., about 90% or 100%), respectively.

Figure 2:
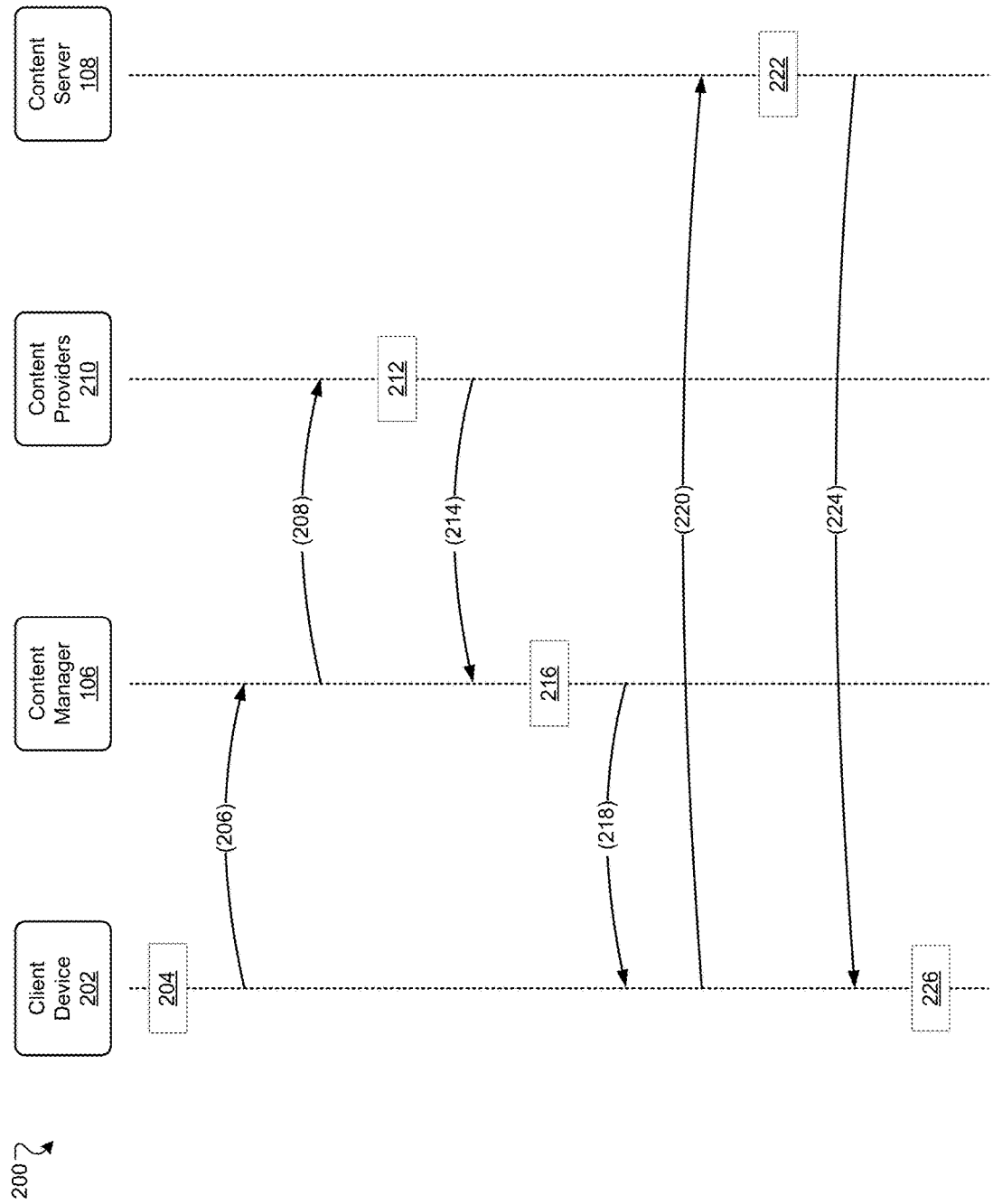
FIG. 2 is an example data flow diagram for a method of providing content to a client device that is compatible with a presentation state of the client device.

FIG. 2 is a data flow diagram of an example method 200 for providing content to a client device 202 (e.g., the smart phone 130). The client device 202 or a software component running on the client device 202 (e.g., the software application) can generate (step 204) a request to receive content (e.g., an image, a video, audio, text, or any combination thereof). The request can include one or more content presentation settings for the client device 202. The request is sent (step 206) from the client device 202 to the content manager 106, which can distribute or forward (step 208) the request, including the content presentation settings, to one or more content providers 210 (e.g., content provider A 110, content provider B 112, and/or content provider C 114). Each content provider 210 can then propose (step 212) an item of content that satisfies the request and can send (step 214) the proposed item of content or a description thereof to the content manager 106. The content manager 106 can select (step 216) one of the proposed items of content and send (step 218) an identification of the selected item of content to the client device 202. The identification can be or include, for example, a web address for the selected item of content and/or a link to the selected item of content. The client device 202 can then send (step 220) a request to the content server 108 for the selected item of content. The content server 108 can obtain (step 222) the selected item of content and provide (step 224) the selected item of content to the client device 202, which can then present (step 226) the selected item of content. For example, the content server 108 can send a file for the selected item of content to the client device 202 and/or can stream the selected item of content to the client device 202. In alternative examples, after the item of content is selected at step 216, the content manager 106 can instruct the content server 108 to obtain and send the selected item of content to the client device 202. This can render steps 218 and 220 unnecessary.

Figure 3:
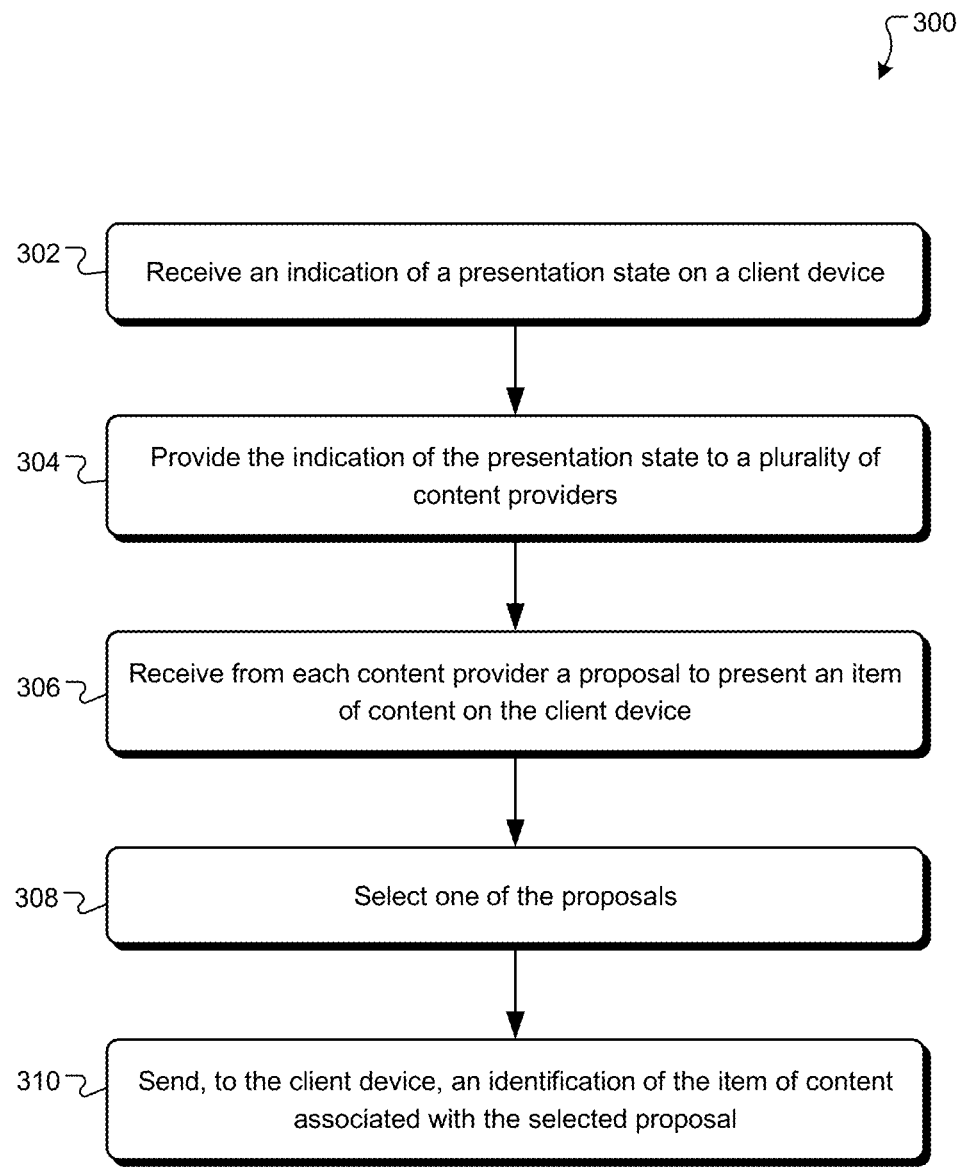
FIG. 3 is a flowchart of an example method of managing the presentation of digital content on a client device.

FIG. 3 illustrates an example computer-implemented method 300 of providing content to a client device. An indication of a presentation state, such as a sound state, on a client device is received (step 302) from the client device. The indication of the presentation state is provided (step 304) to a plurality of content providers. A proposal to present an item of content on the client device is received (step 306) from each content provider. One of the proposals is selected (step 308). An identification of the item of content associated with the selected proposal is sent (step 310) to the client device.

In certain implementations, the content manager 110 can be, include, or utilize a real-time bidding (RTB) exchange or platform that can provide an auction and sale of media inventory in real-time. The content manager 110 can allow online publishers (e.g., providers of websites and/or software applications) to access certain metadata or information about users through a software development kit (SDK) on the users' client devices. Such information can include, for example, a device identifier, a country, a language, a latitude and a longitude of a client device, identification of an operating system (OS) currently installed on a client device, a cellular network used by the client device, demographic information about a user of a client device, and other similar information.

When a user engages with a software application, the publisher can take the metadata provided through a client device SDK and pass the metadata to the content provider 110. The content provider 110 can then send out a request with the metadata to content providers, which can be or include software components for businesses, advertisers, or other entities. Each content provider can have a short time (e.g., about 1 second, 0.5 seconds, or less) to respond to the request with an actual offer, which can be or include an identification of a proposed item of content and/or an amount the content provider is willing to pay to have the proposed item of content (e.g., a video, an image, text, audio, or any combination thereof) presented on the client device. One of the offers can be selected by the content manager (e.g., the highest offer) and the corresponding item of content can be provided on the client device.

In various examples, a client device can include settings that allow a user to control or change how and whether sound is presented on the client device (e.g., using headphones or internal or external speakers). If sound is disabled on the client device, for example, sound generally cannot be played from any application or website the client device is presenting. It is a qualitatively different experience for a user to watch a video with sound (e.g., with sound enabled) compared to the same video without sound (e.g., with sound disabled). In general, when sound is enabled, the video is much more engaging and more likely to capture the attention of the user. Such videos are generally of greater value to the user and/or video or content providers.

According to certain examples of this disclosure, a current sound state of a client device (e.g., enabled or disabled) can be sent as a binary signal or parameter called, for example, "sound enabled" to the content manager 106 so that the one or more content providers can consider the sound state when proposing content. The sound enabled parameter can be, for example, 0 or 1 to indicate that sound has been disabled or enabled, respectively, on the client device. The sound enabled parameter can be included as part of the content presentation settings for the client device.

In some implementations, the sound state can include or utilize a multi-level sound-enabled parameter, for example, instead of a binary (e.g., on or off) value. For example, if sound is enabled but the volume is low (e.g., too low to be heard), content providers may choose to offer content that does not include sound. Conversely, if sound is enabled and the volume is high (e.g., at or near maximum), content providers may choose to offer content that includes sound. The multi-level sound-enabled parameter can include any suitable number of levels to represent the volume level of the sound on the client device. For purposes of illustration and not limitation, there can be, for example, 10 levels for the multi-level sound-enabled parameter, where 0 represents no sound (e.g., sound is disabled) and 10 represents maximum volume. With this approach, any level above 0 can indicate that sound is enabled on the client device. Thus, when the user engages with a software application, the multi-level sound-enabled parameter can be taken by a publisher as part of the metadata provided through the client device's SDK (e.g., via a suitable API call to the operating system to retrieve the sound state of the device) and passed to the content manager 106. The content manager 106 can then send out multi-level sound-enabled parameter, along with other content presentation settings (e.g., a probability that the user is listening to sound or viewing the display on the client device), to one or more content providers. In some instances, sound levels below a certain threshold (e.g., 4 or 5) may cause content providers to offer content that does not include sound, while higher sound levels (e.g., 7, 8, 9, or 10) may cause content providers to offer content that includes sound.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method, comprising:
receiving, from a client device, an indication of a presentation state of the client device, the presentation state comprising a sound state of the client device,
wherein the indication of the presentation state comprises a content presentation setting indicating that sound is disabled on the client device;
providing the indication of the presentation state to a plurality of content providers;
receiving from each content provider a proposal to present an item of content on the client device that is compatible with the presentation state of the client device;
selecting one of the proposals; and
sending, to the client device, an identification of the item of content associated with the selected proposal.

2. The method of claim 1, wherein the presentation state provides an indication of an ability of the client device to present content.

3. The method of claim 1, wherein the sound state provides an indication of an ability of the client device to produce sound for a user of the client device.

4. The method of claim 1, wherein the presentation state further comprises a display state, and wherein the display state comprises an indication of a current ability of the client device to display images for a user of the client device.

5. The method of claim 4, wherein the display state is based at least in part on a detection of a human face in front of a display on the client device.

6. The method of claim 1, wherein the presentation state is based at least in part on one or more of: a sound enablement setting on the client device, a status of a display on the client device, an orientation of the display on the client device, a movement history for the client device, a connection between the client device and an external display, or a connection between the client device and an external speaker.

7. The method of claim 1, wherein providing the indication of the presentation state comprises:
sending the indication of the presentation state over a network from at least one server computer to the plurality of content providers.

8. The method of claim 1, wherein the item of content associated with the selected proposal is compatible with the presentation state.

9. The method of claim 1, wherein sending, to the client device, the identification of the item of content comprises at least one of:
sending a link to the selected item of content, streaming the selected item of content, or sending a file for the selected item of content.

10. A system, comprising:
one or more computer processors programmed to perform operations comprising:
receiving, from a client device, an indication of a presentation state of the client device, the presentation state comprising a sound state of the client device,
wherein the indication of the presentation state comprises a content presentation setting indicating that sound is disabled on the client device;
providing the indication of the presentation state to a plurality of content providers;
receiving from each content provider a proposal to present an item of content on the client device that is compatible with the presentation state of the client device;

selecting one of the proposals; and
  sending, to the client device, an identification of the item of content associated with the selected proposal.

11. The system of claim 10, wherein the presentation state provides an indication of an ability of the client device to present content.

12. The system of claim 10, wherein the sound state provides an indication of an ability of the client device to produce sound for a user of the client device.

13. The system of claim 10, wherein the presentation state further comprises a display state, and wherein the display state comprises an indication of a current ability of the client device to display images for a user of the client device.

14. The system of claim 13, wherein the display state is based at least in part on a detection of a human face in front of a display on the client device.

15. The system of claim 10, wherein providing the indication of the presentation state comprises:
  sending the indication of the presentation state over a network from at least one server computer to the plurality of content providers.

16. The system of claim 10, wherein the item of content associated with the selected proposal is compatible with the presentation state.

17. The system of claim 10, wherein sending, to the client device, the identification of the item of content comprises at least one of:
  sending a link to the selected item of content, streaming the selected item of content, or sending a file for the selected item of content.

18. An article, comprising:
  a non-transitory computer-readable medium having instructions stored thereon that, when executed by one or more computer processors, cause the computer processors to perform
    receiving, from a client device, an indication of a presentation state of the client device, the presentation state comprising a sound state of the client device,
      wherein the indication of the presentation state comprises a content presentation setting indicating that sound is disabled on the client device;
    providing the indication of the presentation state to a plurality of content providers;
    receiving from each content provider a proposal to present an item of content on the client device that is compatible with the presentation state of the client device;
    selecting one of the proposals; and
    sending, to the client device, an identification of the item of content associated with the selected proposal.

* * * * *